UNITED STATES PATENT OFFICE.

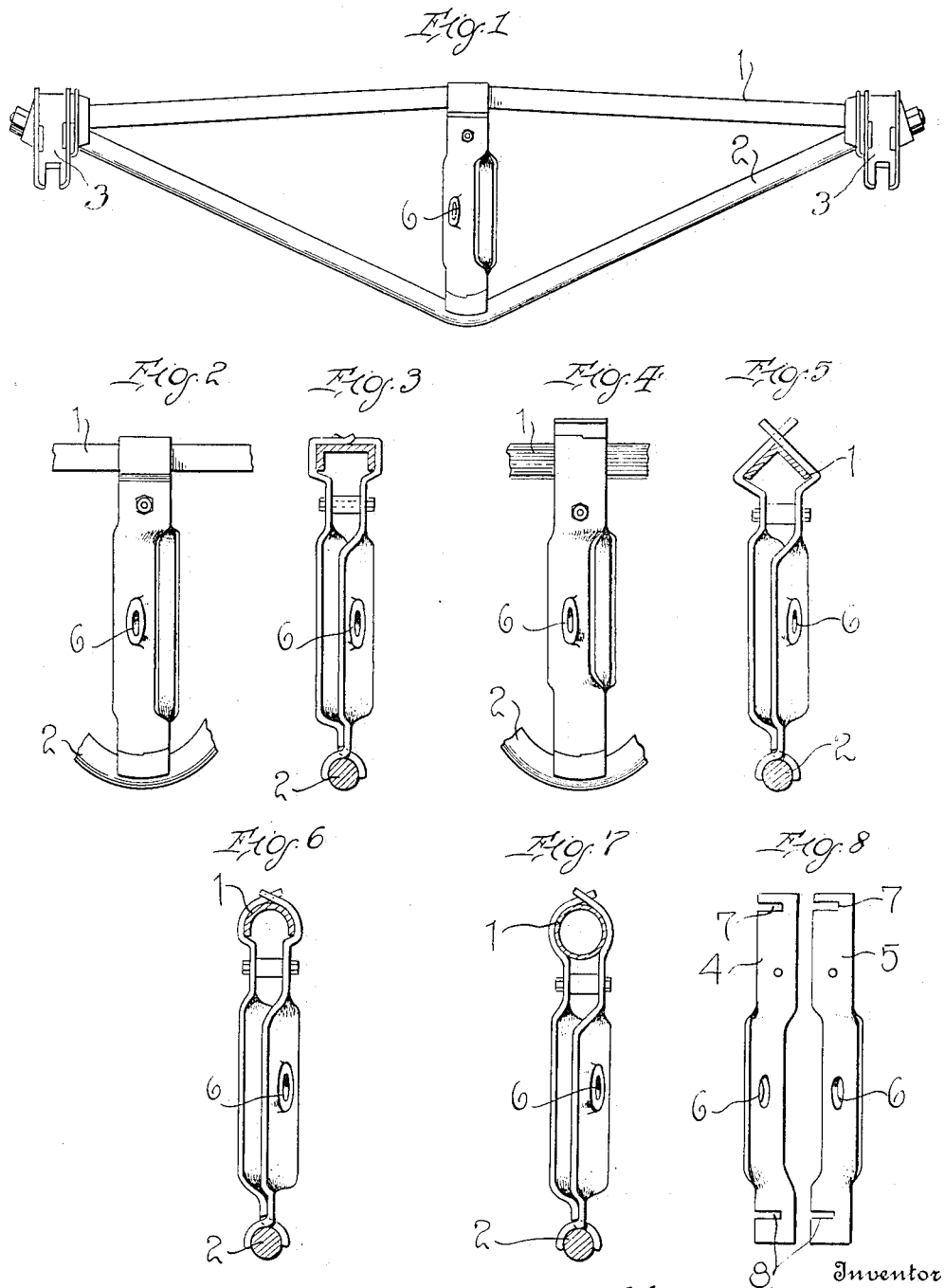

ALBERT WAYCOTT, OF CLEVELAND, OHIO, ASSIGNOR TO THE DAMASCUS BRAKE BEAM CO., OF CLEVELAND, OHIO, A CORPORATION OF OHIO.

BRAKE-BEAM FULCRUM.

1,121,213.

Specification of Letters Patent.

Patented Dec. 15, 1914.

Application filed April 10, 1914. Serial No. 831,097.

*To all whom it may concern:*

Be it known that I, ALBERT WAYCOTT, a citizen of the United States of America, residing at Cleveland, in the county of Cuyahoga and State of Ohio, have invented certain new and useful Improvements in Brake-Beam Fulcrums, of which the following is a specification.

The object of my invention is to provide a two-part fulcrum, each part having end portions constituting brake beam member seats which, when assembled, project across the plane of connection between the members whereby all tendency of the brake beam members to split the fulcrum is eliminated; and with this and other objects in view my invention consists of the parts and combination of parts as will be hereinafter more fully set forth.

In the drawing:—Figure 1 is a view of a trussed brake beam in elevation with one of my improved fulcrums secured thereto; Figs. 2 and 3 are enlarged detail views of the fulcrum at right angles to each other; Figs. 4 and 5 are enlarged detail elevations of another embodiment of the fulcrum at right angles to each other; Figs. 6 and 7 are enlarged detail elevations of the fulcrum showing a different formation at the head thereof; Fig. 8 is an enlarged detail view of the fulcrum members unassembled.

The reference numeral 1 designates the compression member, 2 the tension member and 3 the brake head of a brake beam.

The fulcrum comprises two forgings 4 and 5, each of which has an offset portion intermediate its ends so that when the two parts are assembled, said portions provide a space therebetween to receive a brake lever which is mounted on a bolt secured in the opening 6. The end portions of the fulcrum members are provided with slots 7 at one end and slots 8 at the other end, the slots 7 being nearer the extreme end of the parts than the slots 8. One end of each of the fulcrum members is bent to conform to the configuration of the compression member 1 which may vary as shown in Figs. 3, 5, 6 and 7 and are interlocked with each other by means of the slots 7, the material of one member immediately back of the slot 7 being seated in the slot of the other member and thus interlock, the plane of connection between the members coinciding with the plane of the compression member. The other end portion of each fulcrum part is bent to form one side wall of the seat of the tension member and these tension member ends are interlocked as described in connection with the compression member ends so that each side wall of the tension member seat lies on the opposite side of the plane of connection between the members to the part which carries it.

From the above it will be seen that I have provided a two-part fulcrum in which, even with the plane of connection between its parts coinciding with the plane of the brake beam members, all tendency of the brake beam members to split the fulcrum is eliminated because the side walls of the seats for said members intersect the plane of connection.

I claim:—

1. A two part fulcrum for trussed brake beams each part having end portions which, when assembled, project across the plane of connection between the members.

2. A two part fulcrum for trussed brake beams each part having end portions constituting respectively one wall of a seat for a compression member and for a tension member, said end portions, when assembled projecting across the plane of connection between the members, said members being secured together by a bolt.

3. A two part fulcrum for trussed brake beams, each part being notched near each end whereby they may be interlocked, when assembled, whereby that portion of each part beyond the interlock extends across the plane of connection between the parts.

4. A two part fulcrum for trussed brake beams, each part being notched near each end, whereby they may be interlocked, when assembled; so that that portion of each part beyond the interlock extends across the plane of connection between the parts, the said portion at one end of each part constituting one wall of a bearing for a tension member.

The foregoing specification signed at Cleveland, Ohio, this 20th day of March, 1914.

ALBERT WAYCOTT.

In presence of—
C. R. WAGNER,
A. J. McKENNA.